US011180625B2

(12) United States Patent
Prebe et al.

(10) Patent No.: US 11,180,625 B2
(45) Date of Patent: *Nov. 23, 2021

(54) THERMALLY AND/OR ELECTRICALLY CONDUCTIVE MATERIALS AND METHOD FOR THE PRODUCTION THEREOF

(71) Applicant: HUTCHINSON, Paris (FR)

(72) Inventors: Arnaud Prebe, Amilly (FR); Bruno Dufour, Champagne sur Seine (FR); David Ayme-Perrot, Huningue (FR); Yannick Bureau, Ferrieres-en-Gatinais (FR); Philippe Sonntag, Avon (FR)

(73) Assignee: HUTCHINSON, Paris (FR)

( * ) Notice: Subject to any disclaimer, the term of this patent is extended or adjusted under 35 U.S.C. 154(b) by 709 days.

This patent is subject to a terminal disclaimer.

(21) Appl. No.: 15/566,238

(22) PCT Filed: Apr. 7, 2016

(86) PCT No.: PCT/EP2016/057555
§ 371 (c)(1),
(2) Date: Oct. 13, 2017

(87) PCT Pub. No.: WO2016/166000
PCT Pub. Date: Oct. 20, 2016

(65) Prior Publication Data
US 2018/0291172 A1    Oct. 11, 2018

(30) Foreign Application Priority Data
Apr. 13, 2015 (FR) .................... 1553212

(51) Int. Cl.
*C08J 9/26* (2006.01)
*C08J 9/00* (2006.01)
*B29C 67/20* (2006.01)
*C08F 20/44* (2006.01)
*C08F 36/06* (2006.01)
*C09K 5/14* (2006.01)
*B29K 33/20* (2006.01)
*B29K 105/04* (2006.01)
*H01B 1/24* (2006.01)

(52) U.S. Cl.
CPC .............. *C08J 9/26* (2013.01); *B29C 67/202* (2013.01); *C08F 20/44* (2013.01); *C08F 36/06* (2013.01); *C08J 9/0061* (2013.01); *C08J 9/0066* (2013.01); *C09K 5/14* (2013.01); *B29K 2033/20* (2013.01); *B29K 2105/04* (2013.01); *C08J 2201/046* (2013.01); *C08J 2309/02* (2013.01); *C08J 2333/20* (2013.01); *C08J 2369/00* (2013.01); *C08J 2409/02* (2013.01); *C08J 2433/20* (2013.01); *C08J 2469/00* (2013.01); *H01B 1/24* (2013.01)

(58) Field of Classification Search
CPC .. C08J 9/26; C08J 9/28; B29C 67/202; H01L 31/14; B01D 67/0067; B01D 2321/32; C07C 45/00; B01J 37/082
See application file for complete search history.

(56) References Cited

U.S. PATENT DOCUMENTS

| 3,676,222 | A | 7/1972 | Deibert |
| 5,053,446 | A | 10/1991 | Salyer |
| 5,225,296 | A | 7/1993 | Ohsawa et al. |
| 5,456,852 | A | 10/1995 | Isiguro |
| 5,553,182 | A * | 9/1996 | Haake ............ G02B 6/30 385/49 |
| 5,637,389 | A | 6/1997 | Colvin et al. |
| 5,916,478 | A | 6/1999 | Nakahira et al. |
| 6,306,957 | B1 | 10/2001 | Nakano et al. |
| 7,316,262 | B1 | 1/2008 | Rini et al. |
| 7,820,328 | B1 | 10/2010 | Takeuchi et al. |
| 9,676,941 | B2 | 6/2017 | Eibergen et al. |
| 2002/0004444 | A1* | 1/2002 | Goela ............ C23C 16/01 501/88 |
| 2002/0136887 | A1* | 9/2002 | Penneau .......... B01D 67/003 428/317.9 |
| 2002/0141932 | A1 | 10/2002 | Klett et al. |
| 2002/0147242 | A1 | 10/2002 | Salyer et al. |
| 2003/0092846 | A1* | 5/2003 | Zhao ............ C08L 23/16 525/242 |
| 2003/0157314 | A1 | 8/2003 | Penneau et al. |
| 2003/0175494 | A1 | 9/2003 | Penneau et al. |

(Continued)

FOREIGN PATENT DOCUMENTS

| EP | 0 693 542 A1 | 1/1996 |
| FR | 2 759 087 A1 | 8/1998 |

(Continued)

OTHER PUBLICATIONS

Elmet, Tungsten, W, accessed 2020 (Year: 2020).*
Technical Products, Boron Nitride Grade A Material Specifications, Technical Products (Year: 2017).*
Date information for Boron Nitride Grade A Material Specifications retrieved from Wayback Machine. (Year: 2017).*
Jun. 23, 2016 Search Report issued in International Patent Application No. PCT/EP2016/057554.
3M Mercados Industriales "Jumbo de Esponja Extra Fuerte 86." Jan. 1, 2009.
Oct. 17, 2017 International Preliminary Report on Patentability issued in International Patent Application No. PCT/EP2016/057554.
Jul. 8, 2016 Search Report issued in International Patent Application No. PCT/EP2016/057555.

(Continued)

Primary Examiner — Jacob T Minskey
Assistant Examiner — Elisa H Vera
(74) Attorney, Agent, or Firm — Oliff PLC

(57) ABSTRACT

Porous polymeric materials having a very high content of thermally conductive and/or electrically conductive fillers. Process for the preparation of the porous composite material including at least one binder-forming polymeric phase and one or more fillers, this process including the stages of hot mixing, by the molten route, the polymeric phase, the fillers and a sacrificial polymeric phase, so as to obtain a mixture, of shaping the mixture and of removing the sacrificial polymeric phase.

21 Claims, No Drawings

(56) References Cited

U.S. PATENT DOCUMENTS

| | | | |
|---|---|---|---|
| 2003/0220432 A1* | 11/2003 | Miller | C08K 3/04 524/439 |
| 2005/0020768 A1 | 1/2005 | Pause | |
| 2005/0067346 A1* | 3/2005 | Noack | B01D 53/228 210/503 |
| 2006/0069171 A1* | 3/2006 | Prokopowicz | H01L 21/3121 521/61 |
| 2006/0121269 A1* | 6/2006 | Miller | B01D 67/0027 428/317.9 |
| 2008/0226984 A1 | 9/2008 | Lee et al. | |
| 2010/0204380 A1 | 8/2010 | Kim et al. | |
| 2011/0009544 A1 | 1/2011 | Funahashi | |
| 2011/0040007 A1 | 2/2011 | Chandrasekhar et al. | |
| 2012/0015229 A1* | 1/2012 | Ohashi | B32B 27/18 429/144 |
| 2012/0025131 A1 | 2/2012 | Forero | |
| 2012/0228542 A1* | 9/2012 | l'Abee et al. | H01L 23/3737 252/74 |
| 2013/0298991 A1 | 11/2013 | Parker et al. | |
| 2014/0039082 A1 | 2/2014 | Peterson et al. | |
| 2016/0030625 A1* | 2/2016 | Mrozek | A61L 24/0015 424/497 |
| 2016/0052199 A1* | 2/2016 | Hansen | B29C 67/202 216/55 |
| 2016/0319174 A1 | 11/2016 | Razack et al. | |

FOREIGN PATENT DOCUMENTS

| | | |
|---|---|---|
| FR | 2 759 089 A1 | 8/1998 |
| FR | 2 993 894 A1 | 1/2014 |
| JP | 2001-81446 A | 3/2001 |
| WO | 01/21551 A1 | 3/2001 |
| WO | 03/085346 A1 | 10/2003 |
| WO | 03/099427 A1 | 12/2003 |
| WO | 2005/071001 A1 | 8/2005 |
| WO | 2006/023860 A2 | 3/2006 |
| WO | 2006/062610 A2 | 6/2006 |
| WO | 2007/040395 A1 | 4/2007 |
| WO | 2007/107171 A1 | 9/2007 |
| WO | 2009/064883 A1 | 5/2009 |
| WO | 2009/115512 A1 | 9/2009 |
| WO | 2011035689 A1 | 3/2011 |
| WO | 2012/000935 A1 | 1/2012 |

OTHER PUBLICATIONS

Oct. 17, 2017 International Preliminary Report on Patentability issued in International Patent Application No. PCT/EP2016/057555.

The U.S. Appl. No. 15/566,273, filed Oct. 13, 2017 in the name of Arnaud Prebe et al.

Nov. 12, 2019 Office Action issued in U.S. Appl. No. 15/566,273.

Jan. 28, 2020 Office Action issued in Japanese Patent Application No. 2017-553213.

"Vinylene carbonate". Chemical Book. Accessed at: https://www.chemicalbook.com/ChemicalProductProperty_EN_CB9119200.htm#:~:text=Vinylene%20carbonate%20Properties,162%20%C2%BOC(lit.) (Year: 2017).

Feb. 2, 2021 Office Action issued in U.S. Appl. No. 15/566,273.

Sep. 10, 2021 Office Action Issued in U.S. Appl. No. 15/566,273.

* cited by examiner

THERMALLY AND/OR ELECTRICALLY CONDUCTIVE MATERIALS AND METHOD FOR THE PRODUCTION THEREOF

The invention relates to the field of polymeric materials having a very high content of filler and having a controlled porosity. It relates in particular to the field of materials having a very high content of thermally conductive and/or electrically conductive fillers. It relates to a process for the manufacture of a porous polymeric material comprising a high content of filler. The invention also relates to the polymeric compositions and to the materials obtained by these processes, and also to their uses.

STATE OF THE PRIOR ART

Materials having a high thermal conductivity are used in different applications. They are found mainly in appliances and devices in which heat is generated, where they are used to remove the heat toward the outside, in order to prevent a continuous increase in the temperature and damage to these items of equipment.

For example, the appliances using semiconductors, such as computers, transistors or LEDs, produce heat during their operation and the efficiency of the electronic parts of which they are composed may be damaged by this formation of heat. It is known to use parts of thermally conductive materials in order to remove the heat formed inside these appliances.

In electronic applications in particular, the surface of the heat-generating components is rarely flat and it is preferable to use a shapeable material capable of being adjusted to the shapes of the elements between which it is placed so as to optimize the contact between the thermally conductive material and the heat-producing element, so that the flow of heat is facilitated. In some applications, such as the construction industry, where large-sized parts of thermally conductive material are employed, the aim is to minimize the density of these materials, in particular for reasons of handleability. In the aeronautical field, the aim is also to minimize the density of the on-board elements, in particular electronic components, which incorporate heat sinks made of thermally conductive material.

Consequently, the thermally conductive materials have to exhibit a high thermal conductivity but also, depending on the applications: a high shapeability and a reduced density.

Polymeric materials having a high electrical conductivity are used in different applications. They are found mainly in the manufacture of electric cables or in coatings intended for electromagnetic shielding, for antistatic protection or for lightning protection coatings.

Such materials, according to their uses, have to exhibit a degree of flexibility (electric cables), be able to be adjusted to the outlines of rigid parts of irregular shape and be sufficiently light, for applications in aeronautics in particular.

Consequently, the electrically conductive materials have to exhibit a high electrical conductivity but also, depending on the applications: a high flexibility, a high shapeability and a reduced density.

Usually, in order to produce a thermally conductive material or an electrically conductive material, thermally conductive fillers or electrically conductive fillers respectively are added to a polymer matrix. The thermal or electrical conductivity of the composite resulting from this mixture depends mainly on the type and on the nature of the conductive fillers employed but also on the amount of these fillers present in the material. This is because the matrix is used mainly to provide these fillers with cohesion and generally does not itself have thermally or electrically conductive properties. Thus, the greater the amount of thermally conductive or electrically conductive fillers present in the composite, the greater the overall thermal conductivity or electrical conductivity respectively of the material obtained. However, the incorporation of fillers in high amounts in a polymer matrix is not without difficulties.

The more fillers are introduced into a polymeric matrix, the greater the viscosity of the mixture and the more difficult it is to efficiently transform the mixture by the normal methods of plastics technology. This problem has been solved in different ways in the prior art: by the incorporation of fillers in limited amounts in the final composite, which also limits the conductivity obtained, by the use of polymer precursors of low viscosity which are subsequently crosslinked, or also by the use of a binding polymer in solution in a solvent, which is subsequently evaporated.

Thus, the document U.S. Pat. No. 6,306,957 describes polymeric compositions comprising up to 90% by volume of thermally conductive fillers. These compositions are based on silicone precursors of low molar masses as a mixture with the thermally conductive fillers. The precursor is subsequently crosslinked in order to ensure the strength of the final composite.

US2012/0025131 describes a polymeric composition comprising thermally conductive or electrically conductive fillers. This composition is prepared from a liquid polymeric composition which can be composed of reactive precursors of the epoxide, urethane or silicone resin type crosslinked subsequently or of a solution of a thermoplastic polymer dispersed in a solvent. The content by weight of fillers is not specified.

The preparation of a thermally conductive material by the solvent route presents problems of storage, of handling and of recycling of large amounts of solvents, in particular if organic solvents are used; such a process exhibits disadvantages at the environmental and health level. The manufacture of a polymeric composite material by the solvent route optionally makes it possible to obtain a porous material but with a porosity which is difficult to control. In particular, the production of a porosity of controlled size or of a continuous porosity is difficult to master. In addition, only thin films (a few micrometers in thickness) can be produced by this route.

A thermally conductive material prepared from precursors which are subsequently crosslinked cannot be transformed or recycled. Furthermore, the variety of the polymeric bases which can be employed in these processes is limited and the process times are lengthy. This type of process does not make it possible to obtain a porous material. Finally, such materials cannot be easily shaped and thus are of limited interest in certain applications.

WO2005/071001 describes thermoplastic compositions of the PET or PBT type of high molar masses comprising a thermally conductive filler, calcium fluoride. The composition is prepared by the molten route. Percentages by weight of conductive fillers ranging up to 70% are described.

WO2006/023860 also mentions the production by the molten route of thermoplastic compositions comprising up to 80% by weight of a boron nitride of specific shape, without this possibility being illustrated by examples. The implementation of the process comprises the use of an oil; it is not a thermoplastic transformation process.

US2010/0204380, WO2009/064883 and WO2009/115512 describe a process by the molten route which makes it possible to obtain a thermally conductive composite. The contents by volume of thermally conductive fillers indicated are 70%, 75% and 70% respectively; however, the exemplary embodiments exhibit significantly lower contents of fillers.

WO2012/000935 describes thermoplastic compositions comprising up to 60% by weight of thermally conductive fillers. US2011/0040007 describes the production of a thermally conductive composite based on a thermoplastic polymer having at most 76% by volume of filler.

The implementation of the manufacturing processes described in these documents is rendered difficult by high contents of filler. In addition, the materials obtained are not porous.

In order to overcome these disadvantages, US2011/009544 describes a thermoplastic-based thermally conductive composite obtained by the molten route with surface-functionalized thermally conductive fillers. The fillers are functionalized by silane groups, which allow them to be incorporated in high amounts. However, this solution exhibits the disadvantage of requiring the manufacture of functionalized fillers, which represents an additional cost for the material.

It has been found that the contents of conductive fillers which can be achieved by the molten route with conventional polymers and ungrafted inorganic or carbon-based fillers are, to date, less than 80% by volume. Moreover, such contents of fillers have been obtained only with certain polymers but the conventional processes by the molten route do not make it possible to achieve a high content of filler with any type of polymer. For example, polyacrylonitrile-co-methyl acrylate is known to be difficult to transform by the molten route when it is pure; consequently, to add 70% by volume of filler to this material is noteworthy. Furthermore, the processes by the molten route of the prior art result in a dense nonporous composite.

The document U.S. Pat. No. 7,820,328 describes an electrode material comprising a polymeric binder and a conductive filler in a proportion of less than 10% by weight. This material is obtained by employing a small amount of a sacrificial polymer (at most 5% by weight) which is subsequently thermally decomposed in order to obtain the electrode having a weakly porous nature. This necessarily results in a reduced porosity. However, the process followed is not explicitly described; it is carried out in the presence of solvent or by pressing a powder, so as to form a film of coating on a current collector. The material is intended for a different application from that of the invention; a minor portion of the fillers employed are electrically conductive. No exemplary embodiment illustrates the implementation of a process or the characterization of a product.

The document US2008/0226984 describes an electrode material comprising a polymeric binder and a conductive filler in a high proportion. This material is obtained by employing a small amount of a sacrificial polymer which is subsequently thermally decomposed in order to obtain the electrode. The process employed resorts to the use of solvent. The material is intended for a different application from that of the invention; the fillers employed are electrically but not thermally conductive and the application requires only a low electrical conductivity.

In these two documents, the process results in electrode materials in the form of thin films (approximately 20 μm). The use of small amounts of sacrificial material and of a process by the solvent route or by pressing powder does not make it possible to control the size or the continuity of the porosity.

The document FR 2 759 089 describes a porous composite material of high specific surface and its process of preparation, which employs a sacrificial polymeric phase and fillers having a high specific surface. The soluble or calcinable polymers are not removed in their entirety due to their affinity for the fillers chosen, in particular activated carbon. It is found that more than 20% by weight of these sacrificial polymers remain in the composite material.

The document U.S. Pat. No. 7,820,328 describes an electrode material obtained from a mixture of a binding polymer, of a sacrificial polymer and of electrically conductive fillers. The process is carried out by the solvent route or by compression of powder and employs only from 1% to 5% of sacrificial polymer. It cannot result in a self-supported material.

The objective of the invention was to overcome the problems encountered when the thermally conductive polymeric compositions of the prior art are used. In particular, the aim has been to develop materials which are prepared by the molten route, without solvent, which are recyclable and which incorporate high amounts of thermally conductive fillers and/or electrically conductive fillers. The aim has been to develop a process which can be carried out with inorganic fillers or carbon-based fillers without a stage of functionalization of these fillers being necessary. A process has been employed which makes it possible to obtain a self-supported material, that is to say a material which is not necessarily in the form of a coating applied to a support. In particular, materials have been obtained which exhibit both a sufficient thickness and a sufficient cohesion to be self-supported. When the materials of the invention are in the coating form, the process of the invention makes it possible to obtain materials exhibiting a greater thickness than that of the materials of the prior art.

The aim has also been to employ a process which results in a porous material, so as to be able to obtain a material with a lower density, in comparison with the processes of the prior art. The aim has also been to obtain a material which is shapeable.

SUMMARY OF THE INVENTION

A first subject matter of the invention is a process for the preparation of a porous composite material comprising at least (A) a binder-forming polymeric phase and (B) one or more fillers chosen from:
thermally conductive fillers exhibiting a thermal conductivity of greater than or equal to 5 W/mK and electrically conductive fillers exhibiting a resistivity of less than or equal to 0.1 ohm·cm,
the fillers (B) representing at least 75%, advantageously at least 80%, by weight, with respect to the sum of the weights of the polymeric phase (A) and of the fillers (B), this process comprising the following stages:
a) hot mixing, by the molten route, the polymeric phase (A), the fillers (B) and a sacrificial polymeric phase (C), so as to obtain a mixture,
b) shaping the mixture,
c) removing the sacrificial polymeric phase,
and the sacrificial polymeric phase (C) represents at least 15% by weight of the total weight of the mixture of stage a).

According to a preferred embodiment, the porous composite material comprises, by weight, with respect to the total weight of the material, from 0% to 5% of one or more decomposition residues from the sacrificial phase.

According to a preferred embodiment, the sacrificial polymeric phase (C) represents from 20% to 80% by weight of the total weight of the mixture of stage a).

According to a preferred embodiment, stage a) is carried out in an internal mixer or in an extruder.

According to a preferred embodiment, stage c) is carried out by decomposition by the thermal route of the sacrificial polymeric phase.

According to a preferred embodiment, the sacrificial polymeric phase is based on at least one polymer chosen from polyalkene carbonates, preferably from polyethylene carbonates and polypropylene carbonates.

According to a preferred embodiment, the binder-forming polymeric phase is based on at least one polymer chosen from: thermoplastics, elastomers, thermoplastic elastomers, advantageously from: polyacrylonitrile, polyolefins, halogenated polymers, acrylic polymers, acrylates, methacrylates, vinyl acetates, polyethers, polyesters, polyamides, aromatic polymers, hydrogenated acrylonitrile/butadiene, copolymers of ethylene and of an alkyl acrylate, polyisoprene or rubbers.

According to a first preferred alternative form, the fillers are chosen from: aluminum nitride, boron nitride, magnesium silicon nitride, silicon carbide, diamond, and their mixtures.

According to a second preferred alternative form, the fillers are chosen from: graphite, graphene, carbon nanotubes (CNTs), carbon black, metal fillers, such as aluminum, copper or silver, and their mixtures.

According to a preferred embodiment, stage b) comprises a fashioning in the film form.

According to a preferred embodiment, the process additionally comprises, on conclusion of stage c), a compression stage d).

A further subject matter of the invention is a porous composite material capable of being obtained by the process described in summary above and in more detailed fashion below, which exhibits the following composition, by weight, with respect to the total weight of the material:
from 3% to 25% of at least one polymer chosen from hermoplastic polymers, elastomers and thermoplastic elastomers,
from 75% to 97% of at least one filler chosen from thermally conductive fillers exhibiting a thermal conductivity of greater than or equal to 5 W/mK and electrically conductive fillers exhibiting a resistivity of less than or equal to 0.1 ohm·cm,
from 0% to 5% of one or more additives or decomposition residues from the sacrificial phase.

According to a preferred embodiment, the material is chosen from a self-supported material and a coating with a thickness of greater than or equal to 250 µm.

According to a preferred embodiment, the material is capable of being obtained by a process for the preparation of a porous composite material additionally comprising, on conclusion of stage c), a compression stage d), this material comprising a polymeric matrix, based on polymer chosen from thermoplastic polymers, elastomers and thermoplastic elastomers, and thermally conductive fillers and exhibiting a thermal conductivity in at least one direction of greater than or equal to 15 W/m·K.

Another subject matter of the invention is a polymeric composition capable of being obtained on conclusion of stage a) or of stage b) of the process for the preparation of a porous composite material, this composition comprising at least:

(A) a polymeric phase based on polymers chosen from thermoplastic polymers, elastomers and thermoplastic elastomers,
(B) one or more fillers chosen from thermally conductive fillers exhibiting a thermal conductivity of greater than or equal to 5 W/mK and electrically conductive fillers exhibiting a resistivity of less than or equal to 0.1 ohm·cm,
(C) a sacrificial polymeric phase,
the filler or fillers (B) representing at least 75%, advantageously at least 80%, by weight, with respect to the sum of the weights of the polymer (A) and of the fillers (B), the sacrificial polymeric phase (C) representing at least 15% by weight, with respect to the sum of the weights of (A), (B) and (C).

A further subject matter of the invention is a process for the manufacture of a thermally conductive and/or electrically conductive porous carbon-based material, this process comprising the implementation of the process for the preparation of a porous composite material and additionally comprising, on conclusion of this process, at least one stage d) of pyrolysis or of graphitization,

DETAILED DESCRIPTION

This result was obtained by means of a method which makes it possible to incorporate, directly in the molten state and by conventional plastic transformation methods, very high contents of thermally conductive and/or electrically conductive inorganic or carbon-based fillers, of greater than 80% by weight, in the final material. This process makes it possible to obtain a porous material and to control the porosity within the final product. This result is obtained by using a polymer phase, which forms the binder of the final material, in combination with a sacrificial phase. The composition is chosen from the viewpoint of the manufacturing process employed and of the final application of the material. The process of the invention also makes it possible to orientate the fillers with an aspect ratio, on the basis of the processing parameters and, if appropriate, on the basis of an additional recompression stage. The process of the invention has made it possible to produce, by the molten route, thermally conductive and/or electrically conductive materials which contain a content of inorganic or carbon-based fillers of greater than 80% by weight without modifying the surface of the fillers beforehand or using a coupling agent or solvent, these materials being used as they are.

The mixing, the dispersing and the homogeneous distributing of the binding polymer and of the sacrificial phase and of the different inorganic or carbon-based fillers are provided by the use of the melt process. An optional pyrolysis or graphitization of the binding polymer is possible in a second step in order to optimize the performance, depending on the application envisaged. The control of the porosity in terms of size, of volume and of morphology is provided by the control of the mixing parameters (screw profile, and the like) during the implementation of the process. In a second step, the material can be subjected to a compression stage which results in a reduction in the pore volume. The control of the porosity is adjusted depending on the application envisaged.

In the present description, the expression "polymer" denotes both homopolymers and copolymers. It includes mixtures of polymers, oligomers and mixtures of monomers, of oligomers and polymers.

The expression "essentially composed of", followed by one or more characteristics, means that components or stages which do not significantly modify the properties and characteristics of the invention can be included in the process or the material of the invention, in addition to the components or stages explicitly listed.

The Binder-Forming Polymeric Phase:

The material of the invention is composed in particular of a binder-forming polymeric phase which provides it with its cohesion. The polymeric phase can be of any nature, provided that it can be melt transformed and that it is compatible with the sacrificial phase chosen.

The binder-forming polymeric phase advantageously exhibits a melting point lower by at least 20° C. with respect to the decomposition temperature of the sacrificial phase, so as to make possible the melt transformation of the mixture. The binder-forming polymeric phase is solid at ambient temperature (in the vicinity of 20-25° C.) since it has to be able to be shaped and will constitute the binder of the final material.

The compatibility between the binder-forming polymeric phase and the sacrificial polymeric phase is evaluated in a way well-known to a person skilled in the art by melt blending the materials and by observing if a phase separation is produced or if the mixture is substantially homogeneous. In order to carry out the process and to obtain a satisfactory material, it is necessary to avoid a phase macroseparation between the binding polymer and the sacrificial polymer during the processing, which macroseparation would be reflected by the presence of a pure nondispersed polymer phase with a size of greater than a few tens of microns.

To produce this mixture, different parameters make it possible, in a well-known way, to adjust the compatibility between the two phases. Mention may be made, for example and without limitation, of: choice of the equipment, such as screw profile; proportion of the phases; compatibilizing agent. Reference may be made to a general work, such as: "Mixing and Compounding of Polymers: Theory and Practice", 2nd edition, Ica Edition, Manas-Zloczower, which describes in detail the main areas of general knowledge regarding mixing of polymers.

The choice of the two phases makes it possible to control the implementation of the process but also the properties of the final material, such as its integrity, its porosity and its shapeability.

The nature of the material of which the binder-forming polymeric phase is composed is chosen depending on the final properties which are expected for the material, such as, for example, its plasticity or its mechanical properties.

According to an embodiment of the invention, pyrolyzable and/or graphitizable polymers are employed in the binder-forming polymeric phase. After an additional pyrolysis or graphitization stage, these polymers make it possible to obtain materials having a carbon-based structure which possess a thermal and/or electrical conductivity.

The binder-forming polymeric phase comprises polymers and optionally additives. Preferably, the polymers represent at least 75% by weight of the binder-forming polymeric phase, advantageously at least 90%.

Advantageously, the polymers employed in the process of the invention and which participate in the composition of the final material (before an optional pyrolysis or graphitization) are chosen from: thermoplastics, elastomers and thermoplastic elastomers. Mention may be made, for example, of: polyacrylonitrile, polyolefins, halogenated polymers, acrylic polymers, acrylates, methacrylates, vinyl acetates, polyethers, polyesters, polyamides, aromatic polymers or also elastomeric polymers, such as, for example, hydrogenated acrylonitrile/butadiene (HNBR), copolymers of ethylene and of an alkyl acrylate, polyisoprene or other rubbers.

Advantageously, the binder-forming polymeric phase is based on at least one polymer chosen from: thermoplastics, elastomers or thermoplastic elastomers, which means that the thermoplastic polymers, the elastomers and the thermoplastic elastomers represent at least 95% by weight of the polymers of the binder-forming polymeric phase, advantageously at least 98%.

According to a preferred embodiment of the invention, the binder-forming polymeric phase comprises at least 50%, preferably at least 90% and better still at least 95% by weight of at least one polymer chosen from polyacrylonitrile, hydrogenated acrylonitrile/butadiene and their mixtures.

Mention may be made, among the additives capable of being used in the binder-forming polymeric phase, of the additives which are chosen for their function in the final material, such as, for example: agents which improve the resistance to fire or to oxidation or also crosslinking agents, such as bifunctional organic compounds, organic peroxides or sulfur-based compounds (for the crosslinking of the rubbers), or coagents, such as triallyl cyanurate. The use of these additives is of use without being necessary to the invention and depends directly on the application targeted.

The Sacrificial Polymeric Phase:

The sacrificial polymeric phase is composed of materials which have the property of decomposing during the application of a chosen external stress, such as, for example, by raising the temperature or by dissolution in a solvent. The removal or the extraction of the sacrificial phase has to be able to be carried out without having an impact on the remainder of the material. It is preferable to use, as sacrificial material, a compound which leaves little or no residues during the decomposition.

Advantageously, the sacrificial polymeric phase is solid at ambient temperature (in the vicinity of 20-25° C.), so as to make possible the shaping of the composition.

Preferably, a sacrificial phase which can be extracted by thermal decomposition is chosen and polymers having a clear-cut degradation temperature known from the literature are favored, it being ascertained that the degradation temperature of the sacrificial phase is lower by at least 20° C. with respect to the degradation temperature of the polymer(s) chosen for the binder-forming polymeric phase. Mention may be made, among the polymers capable of being removed by raising the temperature, of polyalkene carbonates, such as, for example, polyethylene carbonates and polypropylene carbonates. Generally, these materials exhibit the advantage of decomposing with a moderate or zero expansion in volume. Thus, the volume of the part shaped is not or only slightly affected by the stage of decomposition of the sacrificial phase. In the presence of certain fillers, such as graphite, the use of polyalkene carbonates can nevertheless sometimes result in an expansion in volume. In order to improve the fluidity of the intermediate polymeric material and to facilitate the implementation of the process, in a way known to a person skilled in the art, it is possible to use a mixture of polyalkene carbonates of different molar masses.

According to another embodiment, the sacrificial polymeric phase can be extracted by a solvent and is based on at least one sacrificial polymer, extractable by the liquid route, preferably chosen from: polyethylene glycols, polypropylene glycols and their mixtures.

The sacrificial polymeric phase comprises polymers and optionally additives. Preferably, the polymers represent at least 95% by weight of the sacrificial polymeric phase, advantageously at least 98%.

Advantageously, the sacrificial polymeric phase is based on at least one polymer chosen from polyalkene carbonates, which means that the polyalkene carbonates represent at least 95% by weight of the sacrificial polymeric phase, advantageously at least 98%.

According to a preferred embodiment of the invention, the polyethylene carbonates and the polypropylene carbonates represent at least 95% by weight of the sacrificial polymeric phase, advantageously at least 98%.

Mention may be made, among the additives capable of being used in the sacrificial polymeric phase, of photoacid generators which act as additives for helping in the decomposition of the sacrificial phases. Such products are described in Cupta M., Jayachandran P. and Khol P., Photoacid generators for catalytic decomposition of polycarbonate, *Journal of Applied Polymer Science,* 2007, Vol. 105, pp. 2655-2662, for polypropylene carbonate, for example. The use of these photoacids in the sacrificial polymeric phase makes it possible to reduce the degradation temperatures. They are thus of use without being necessary to the invention.

The Fillers:

According to the properties expected for the composite polymeric material, thermally conductive fillers, electrically conductive fillers or fillers exhibiting both properties are employed.

The Thermally Conductive Fillers:

According to a first embodiment of the invention, thermally conductive fillers are employed in the process and the composite material of the invention. The thermally conductive filler is chosen from those having a thermal conductivity of greater than or equal to 5 W/mK.

The intrinsic thermal conductivity of known fillers is described, for example, in Thermal Conductivity of Nonmetallic Solids," Y. S. Touloukian, R. W. Powell, C. Y. Ho and P. G. Klemans, IFI/Plenum, New York-Washington, 1970, or in "Thermal Conductivity—Theory, Properties and Applications," T. M. Tritt, Ed., Kluwer Academic/Plenum Publishers, New York, 2004.

Preferably, the thermally conductive filler has an intrinsic thermal conductivity of greater than or equal to 10 W/mK, more preferably of greater than or equal to 25 W/mK and advantageously of greater than or equal to 50 W/mK.

Thermally conductive fillers which can be employed in the invention are, for example: AlN (aluminum nitride), BN (boron nitride), $MgSiN_2$ (magnesium silicon nitride), SiC (silicon carbide), graphite, graphene, carbon nanotubes (CNTs), carbon nanofibers, carbon black, diamond, metal fillers, such as aluminum, copper or silver, or a combination of these.

It should be emphasized that some of these fillers, such as metal fillers, graphite, graphene, carbon nanotubes (CNTs), carbon nanofibers or carbon black, can also be electrically conductive. When it is desired to obtain an electrically insulating material, the use of such fillers is avoided. In this case, use is preferably made of a filler exhibiting a resistivity of greater than or equal to $10^3$ ohm·cm, such as aluminum nitride, boron nitride, magnesium silicon nitride or silicon carbide.

The Electrically Conductive Fillers:

The electrically conductive filler is chosen from those exhibiting a resistivity of less than or equal to 0.1 ohm·cm.

Electrically conductive fillers which can be employed in the process and the material of the invention are, for example: graphite, graphene, carbon nanotubes (CNTs), carbon nanofibers, carbon black, metal fillers, such as aluminum, copper or silver, or a combination of these.

The Additives:

Besides the additives intended to modify the properties of the final material, in particular before pyrolysis, and those intended to facilitate the removal of the sacrificial phase, it is possible to add, to the composition, specific additives in order to improve and/or optimize the process for the manufacture of the materials, such as, for example, compatibilizing agents. These additives, which facilitate the implementation of the process, can be incorporated beforehand in one or other of the polymeric phases, or with the fillers, or they can be incorporated independently.

The Process for the Preparation of a Porous Composite Material:

The process of the invention is based on the use of a sacrificial polymeric phase in a melt process, simultaneously making possible plasticization, a better fluidity of the material during the processing and a melt cohesion but also the creation of a controlled porosity. For example, an open porosity may be desired in order to reduce the density of the material while providing a high thermal conductivity. The porosity can be directly controlled by the amount of sacrificial material introduced or by an optional compression of the material after shaping and removal of the sacrificial phase. It should be noted that the process according to invention makes possible both short processing times, typical of conventional plastics technology processes, such as extrusion, but also the use of stages requiring a melt cohesion, such as extrusion calendering. It should also be emphasized that the ability of the mixture to be transformed is maintained after shaping, provided that no extraction or pyrolysis or graphitization has been carried out.

This process comprises the following stages:

a) hot mixing, by the molten route, the binder-forming polymeric phase (A), the fillers (B) and the sacrificial polymeric phase (C), so as to obtain a mixture,
b) shaping the mixture,
c) removing the sacrificial polymeric phase.

Stage a) can be carried out in a known way in any type of item of equipment which makes it possible to homogenize the composition while heating it. Mention may in particular be made of an internal mixer or an extruder. The process of the invention exhibits numerous advantages in comparison with the previous processes and in particular the mixing stage is carried out without solvent. The binder-forming polymeric phase is homogeneously dispersed in the continuous sacrificial polymeric phase or else it forms a phase cocontinuous with the latter.

It is possible, in order to facilitate the production of a homogeneous mixture, for example, to employ the sacrificial polymeric phase in the form of granules with a number-average size of greater than 1 mm.

The heating is controlled so as to bring the polymeric phases to melting without decomposing the sacrificial phase or to a temperature at which the sacrificial phase decomposes very slowly (over a period of time of greater than 1 h). Advantageously, the heating in stage a) is controlled in order to bring the mixture to a temperature at least greater by 20° C. than the glass transition temperature or the melting point of the polymers of the binder-forming polymeric phase.

The shaping stage is adjusted as a function of the final shape and of the dimensions which it is desired to confer on the object. The shaping can consist, for example, of one or more stages chosen from: extrusion, blowing, injection molding, molding, calendering, kneading and their combinations.

One advantage of the process of the invention lies in the possibility, when fillers with an aspect ratio are used, to orientate these fillers. The creation of a porosity contributes in itself to the orientation of these fillers. Furthermore, the passage through an extrusion die under chosen pressure conditions makes it possible to confer an orientation on such fillers. The compression and/or the calendering can also contribute to the orientation of the fillers. Such an orientation of fillers in the porous composite material is reflected by an asymmetry in the properties and makes it possible to increase the thermal conductivity or electrical conductivity properties in one direction of the material.

The process of the invention also makes it possible to obtain objects of varied shapes which are self-supported and not only coatings attached to a support.

Preferably, the sacrificial polymeric phase is substantially removed without leaving residues. This stage can be carried out in a known way by raising the temperature, for example in an oven. It can also be carried out by other means, such as, for example, by dissolution of the sacrificial phase using a solvent.

Besides the stages described above, the process of the invention can comprise other stages. In particular, according to an embodiment of the invention, it comprises one or more shaping stages on conclusion of stage c) and in particular a cutting of the material to the desired dimensions or a compression which makes it possible to reduce the porosity. The compression can, for example, be carried out by means of a platen press or by calendering. An optional crosslinking of the binder-forming phase is possible in order to optimize the mechanical properties and the cohesion of the composition if a subsequent transformation is not envisaged.

The Porous Composite Material

The porous composite material of the invention comprises at least one polymeric phase, based on polymer chosen from thermoplastic polymers, elastomers and thermoplastic elastomers, and at least one filler chosen from thermally conductive fillers and electrically conductive fillers, the filler(s) representing at least 75%, advantageously at least 80%, by weight, with respect to the total weight of the material. Advantageously, the filler(s) represent at least 60% by volume, with respect to the total volume of the material.

Advantageously, the porous composite material comprises or better still is essentially composed of, by weight, with respect to the total weight of the material:
from 3% to 25% of at least one polymer chosen from thermoplastic polymers, elastomers and thermoplastic elastomers,
from 75% to 97% of at least one filler chosen from thermally conductive fillers and electrically conductive fillers,
from 0% to 5% of one or more additives or of decomposition residues from the sacrificial phase.

Preferably, the porous composite material comprises or better still is essentially composed of, by weight, with respect to the total weight of the material:
from 3% to 20% of at least one polymer chosen from thermoplastic polymers, elastomers and thermoplastic elastomers,
from 80% to 97% of at least one filler chosen from thermally conductive fillers and electrically conductive fillers,
from 0% to 2% of one or more additives or of decomposition residues from the sacrificial phase.

More preferably still, the porous composite material comprises or better still is essentially composed of, by weight, with respect to the total weight of the material:
from 4% to 10% of at least one polymer chosen from thermoplastic polymers, elastomers and thermoplastic elastomers,
from 90% to 96% of at least one filler chosen from thermally conductive fillers and electrically conductive fillers,
from 0% to 1% of one or more additives or of decomposition residues from the sacrificial phase.

According to an embodiment of the invention, the porous composite material comprises or better still is essentially composed of, by weight, with respect to the total weight of the material:
from 3% to 25% of at least one polymer chosen from: polyacrylonitrile, polyolefins, halogenated polymers, acrylic polymers, acrylates, methacrylates, vinyl acetates, polyethers, polyesters, polyamides, aromatic polymers, hydrogenated acrylonitrile/butadiene, copolymers of ethylene and of an alkyl acrylate, polyisoprene or rubbers.
from 75% to 97% of at least one filler chosen from: aluminum nitride, boron nitride, magnesium silicon nitride, silicon carbide, diamond, and their mixtures,
from 0% to 5% of one or more additives or of decomposition residues from the sacrificial phase.

According to an advantageous embodiment of the invention, the porous composite material comprises or better still is essentially composed of, by weight, with respect to the total weight of the material:
from 3% to 20% of at least one polymer chosen from: polyacrylonitrile, polyolefins, halogenated polymers, acrylic polymers, acrylates, methacrylates, vinyl acetates, polyethers, polyesters, polyamides, aromatic polymers, hydrogenated acrylonitrile/butadiene, copolymers of ethylene and of an alkyl acrylate, polyisoprene or rubbers,
from 80% to 97% of at least one filler chosen from: aluminum nitride, boron nitride, magnesium silicon nitride, silicon carbide, diamond, and their mixtures,
from 0% to 2% of one or more additives or of decomposition residues from the sacrificial phase.

According to a preferred embodiment of the invention, the porous composite material comprises or better still is essentially composed of, by weight, with respect to the total weight of the material:
from 4% to 10% of at least one polymer chosen from: polyacrylonitrile, polyolefins, halogenated polymers, acrylic polymers, acrylates, methacrylates, vinyl acetates, polyethers, polyesters, polyamides, aromatic polymers, hydrogenated acrylonitrile/butadiene, copolymers of ethylene and of an alkyl acrylate, polyisoprene or rubbers.
from 90% to 96% of at least one filler chosen from: aluminum nitride, boron nitride, magnesium silicon nitride, silicon carbide, diamond, and their mixtures,
from 0% to 1% of one or more additives or of decomposition residues from the sacrificial phase.

Advantageously, this material is obtained on conclusion of the process described above.

The material of the invention exhibits a proportion of fillers which is greater than those known from the prior art for compositions based on polymers of the same nature. It thus exhibits improved thermal conductivity and/or electrical conductivity properties in comparison with the compositions of the prior art. The porous composite material of the invention exhibits a porosity and a density which can be controlled. This is because several processing parameters make it possible to modify these properties of the material: the proportions of the initial mixture of (A), (B) and (C), and optionally the form of shaping, an optional compression stage. The porosity can thus be controlled in terms of size, of morphology and of amount of the pores. Depending on the applications and the constraints related to the use, the choice is made to favor a higher or lower density of the material. An extreme compression can make it possible to achieve a very low porosity.

The term "porous composite material" is understood to mean a material, at least 1% by volume, advantageously at least 10% by volume, of which consists of pores.

Advantageously, the material of the invention exhibits a continuous porosity.

According to an embodiment of the invention, the porosity represents from 10% to 70% by volume, with respect to the total volume of the material, preferably from 20% to 60%.

The material is shaped as a function of the use envisaged, in particular in the form of sheets or films but also of sheaths, of cables, of coatings, of granules or of housings.

Advantageously, the material of the invention is self-supported.

In comparison with the porous composite materials described in the prior art, the material of the invention exhibits the advantage of not necessarily being in the form of a coating. In comparison with the materials obtained by the solvent route, which can also be porous, the material of the invention exhibits the advantage of being able to exhibit varied shapes of sizeable thickness. This is because, by the solvent route, access is had to materials in the form of films with a maximum thickness of a few hundred microns, whereas the materials of the invention can be of any shape and of any dimension. Assuming that the material of the invention is in the form of a film, for example of a coating film, advantageously, it has a thickness of greater than or equal to 250 µm, preferably of greater than or equal to 500 µm, more advantageously of greater than or equal to 1 mm and better still of greater than or equal to 2.5 mm.

The material of the invention is advantageously characterized in that it exhibits, in all directions of space, a thickness of greater than or equal to 250 µm, preferably of greater than or equal to 500 µm and more advantageously of greater than or equal to 1 mm.

The materials of the invention exhibit an advantageous combination of properties. For example, it is possible to obtain, by the process of the invention, a material comprising a polymeric matrix, based on polymer chosen from thermoplastic polymers, elastomers and thermoplastic elastomers, which exhibits both a porosity by volume of greater than or equal to 40% and a thermal conductivity in at least one direction of greater than or equal to 5 W/m·K.

According to another alternative form of the invention, it is possible to obtain materials comprising a polymeric matrix, based on a polymer chosen from thermoplastic polymers, elastomers and thermoplastic elastomers, and thermally conductive fillers and exhibiting a thermal conductivity in at least one direction of greater than or equal to 15 W/m·K.

One advantage of the material of the invention, in comparison with the materials of the prior art, in particular crosslinked materials, is that it can be transformed and can be recycled. It is possible in particular to employ, in stage a) of the process described above, a porous composite material according to the invention based on polymer and on fillers by adding thereto a new sacrificial phase, optionally other additional polymers and fillers, and to thus carry out a new transformation cycle.

The targeted applications are different as a function of the type of filler which has been chosen.

In an embodiment, thermally conductive fillers are used. According to this embodiment, the material of the invention can be used in numerous applications, such as: heat sink in an item of electronic equipment, motor vehicle cases, lamp cases, in particular LED lamp cases, encapsulation of electronic components, battery cases, electrical cabinets or servers.

In another embodiment, electrically conductive fillers are used. According to this embodiment, the material of the invention can be used in numerous applications, such as: electric cables, coatings for electromagnetic shielding, lightning protection or antistatic protection.

The Polymeric Composition

The polymeric composition is an intermediate composition of the process of the invention obtained on conclusion of stage a) or b), according to whether it is still in the molten state or already shaped. It is a precursor of the porous composite material.

This composition comprises at least:
(A) a melt transformable polymer phase, advantageously based on polymers chosen from thermoplastic polymers, elastomers and thermoplastic elastomers,
(B) a filler chosen from thermally conductive fillers and electrically conductive fillers,
(C) a sacrificial polymeric phase,
the fillers (B) representing at least 75%, advantageously at least 80%, by weight, with respect to the sum of the weights of the polymer (A) and of the fillers (B), the sacrificial polymeric phase (C) representing at least 15% by weight, with respect to the sum of the weights of (A), (B) and (C).

Advantageously, the polymeric composition comprises, by weight, with respect to the total weight of the composition:
(A) from 1% to 15% of polymer phase based on polymers chosen from thermoplastic polymers, elastomers and thermoplastic elastomers,
(B) from 35% to 70% of filler(s) chosen from thermally conductive fillers and electrically conductive fillers,
(C) from 20% to 60% of sacrificial polymeric phase,
(D) from 0% to 3% of additives.

More advantageously still, the polymeric composition is essentially composed, by weight, with respect to the total weight of the composition, of:
(A) from 1% to 15% of polymer phase based on polymers chosen from thermoplastic polymers, elastomers and thermoplastic elastomers,
(B) from 35% to 70% of filler(s) chosen from thermally conductive fillers and electrically conductive fillers,
(C) from 20% to 60% of sacrificial polymeric phase,
(D) from 0% to 3% of additives.

This polymeric composition can be prepared and shaped directly in the form desired for the use (film, case, and the like).

Alternatively, an embodiment is provided where the composition is prepared (homogeneous melt blend of the components (A), (B) and (C)) and put into the form of granules, for example. This composition is subsequently easily reintroduced into the process of the invention in stage a). This embodiment makes it possible to provide a ready-for-use composition which does not require metering of the components and avoids the handling errors related to the introduction of the components into the mixer.

Process for the Manufacture of a Thermally Conductive and/or Electrically Conductive Porous Carbon-Based Material:

According to an embodiment of the invention, the composite material obtained on conclusion of the process described above can also be transformed by application of a pyrolysis or graphitization treatment. In a known way, such a treatment is carried out at a temperature of greater than or equal to 500° C., respectively of greater than or equal to 1000° C., For this, the choice of the binder-forming polymeric phase has to have been adapted in order to make this stage possible. A carbon-based material is thus obtained which comprises a high amount of thermally conductive or electrically conductive fillers and which has a controlled porosity and a controlled density.

Such a material can be used for the following applications: encapsulation of electronic components, battery cases, electrical cabinets or servers.

EXPERIMENTAL PART

I—MATERIALS AND METHODS

I.1 MATERIALS

Binder-Forming Polymer:
BP 1: polyacrylonitrile, sold by Ineos under the reference Barex 210®
BP 2: HNBR (hydrogenated acrylonitrile/butadiene) elastomer, sold by Zeon Chemicals under the reference Zetpol 2010L®
Sacrificial Polymer:
SP 1: polypropylene carbonate, sold by Novomer under the reference Polyol 211-10®
SP 2: polypropylene carbonate, sold by Empower Materials under the reference QPAC40®
Thermally Conductive Filler:
F1: Graphite, sold by Timcal under the reference C-therm 001©
F2: Aluminum nitride
Extruder: Coperion ZSK18
Internal mixer: 300-ml Scamex

I.2. TEST AND CHARACTERIZATION METHODS

Thermal Conductivity:
The materials were characterized at ambient temperature and in the plane by the hot disk TPS thin plate method, following the NI ISO22007-2: 2008-12 Plastics standard.
Density:
In order to evaluate the density, the weight of the material was measured on a precision balance and the volume was measured with calipers, everything being done at ambient temperature.

II. POLYMERIC COMPOSITIONS AND COMPOSITE MATERIALS

In the tables of compositions, the "Before extraction" columns describe the proportions of the composition before stage c) of removal of the sacrificial phase and the "After extraction" columns describe the material obtained after stage c).

II.1 EXAMPLE 1

Formulation:
A mixture having the following composition was prepared:

TABLE 1.1

| Composition | Before extraction | | After extraction | |
| --- | --- | --- | --- | --- |
| | % weight | % volume | % weight | % volume |
| BP1 | 13.2 | 17.4 | 19.9 | 29.1 |
| SP1 | 13.8 | 16.5 | 0 | 0 |
| SP2 | 19.8 | 23.8 | 0 | 0 |
| F1 | 53.2 | 42.3 | 80.1 | 70.9 |

Preparation Method:
Stage a: Preparation of the Composition and Extrusion of a Film of Composite Material
The composition was prepared by using a twin-screw extruder at 175° C. All the starting materials were directly injected into the extruder by virtue of gravimetric metering devices for the powders and the granules and via an injection needle for the liquids. The flow rates by weight of each component were regulated so as to obtain the composition described above.
Stage b: Shaping
The use of a gear pump behind the twin-screw extruder made it possible to continuously extrude films with a thickness of 2 mm. The film was cut up in the form of samples with dimensions of 5 cm×5 cm.
Stage c: Removal of the Sacrificial Phase
The film sample obtained above was subjected to a stage of decomposition of the sacrificial phase in an oven under air at 230° C. for 20 min. The measurement of the difference in weight before and after the heat treatment makes it possible to monitor and to control the removal of the polypropylene carbonate. 100% of the polypropylene carbonate initially incorporated in the mixture is decomposed and removed. A porous material is obtained which consists of binder-forming polymer BP1 and of filler F1 in the proportions of table 1.1, the porosity of which represents approximately 40% by volume, with respect to the total volume of the material.
Stage d: Compression
The porous material obtained in the preceding stage was compressed under a platen press at 80° C. and 80 bar down to a thickness of 1.5 cm, which results in a very significant reduction in the porosity.
Stage e: Pyrolysis
The material is placed in a furnace and subjected to a pyrolysis treatment at 600° C. for 5 hours, in order to pyrolyze the polyacrylonitrile binder.
Properties:
At each stage, a sample was withdrawn and the change in the thermal conductivity was measured. The thermal conductivities obtained at the end of each processing stage are reported in table 1.2.

TABLE 1.2

| Treatment | Radial thermal conductivity (W/m · K) |
| --- | --- |
| Stage a (mixing and extrusion) | 16.6 |
| Stage c (removal of the sacrificial phase) | 12.5 |
| Stage d (compression) | 16.9 |
| Stage e (pyrolysis) | 17.1 |

II.1 EXAMPLE 2

Formulation

A mixture having the following composition was prepared:

TABLE 2.1

|  | Before extraction | | After extraction | |
|---|---|---|---|---|
| Composition | % weght | % volume | % weight | % volume |
| BP2 | 37 | 5.9 | 6.1 | 11.3 |
| SP1 | 25.1 | 30.7 | 0 | 0 |
| SP2 | 13.5 | 16.6 | 0 | 0 |
| F1 | 57.7 | 46.8 | 93.9 | 88.7 |

Preparation Method:

Stage a: Preparation of the Composition and Formation of a Film of Composite Material The composition was prepared using an internal mixer at 80° C. The binder-forming polymer BP2 and the sacrificial polypropylene carbonate SP2 were introduced and mixed first in order to obtain a plasticized molten mixture. Subsequently, the inorganic fillers F1 were gradually added with regular addition of the sacrificial polymer SP1 (a preheating of the substance at approximately 60° C. may be necessary in order to reduce the viscosity thereof and to facilitate the addition) until a homogeneous mixture is obtained.

Stage b: Shaping

The mixture obtained above was subsequently calendered in the form of a sheet with a thickness of 0.5 cm. The film obtained was cut up in the form of samples with dimensions of 5 cm×5 cm.

Stage c: Removal of the Sacrificial Phase

The film sample obtained above was subjected to a stage of decomposition of the sacrificial phase in an oven under air at 230° C. for 20 min. The measurement of the difference in weight before and after the heat treatment makes it possible to monitor and to control the removal of the polypropylene carbonate. 100% of the polypropylene carbonate initially incorporated in the mixture is decomposed and removed. An expansion in volume of the material is observed during this stage. A porous material is obtained which consists of binder-forming polymer BP2 and of filler F1 in the proportions of table 2.1.

Stage d: Compression

The mixture is compressed under a press at 80° C. and 50 bar down to a film thickness of 0.5 cm, in order to regain the original thickness. This is because, during the decomposition, a slight swelling of the mixture is observed. The material after compression exhibits a density of 0.844 g/cm$^3$ instead of 1.80 g/cm$^3$ in theory (the theoretical density is calculated from the formulation and from the density of each element). It is deduced, from the measurement of the density, that the material obtained exhibits a porosity of 53% by volume, with respect to the total volume of the material.

Properties:

On conclusion of stage d, the thermal conductivity of the material was measured in the radial direction and in the axial direction. The thermal conductivities obtained are reported in table 2.2.

TABLE 2.2

| Direction | Thermal conductivity (W/m · K) |
|---|---|
| Radial | 16.0 |
| Axial | 1.49 |

It is found that the material obtained has several properties simultaneously: a high thermal conductivity, an orientation of the fillers and also a low density.

II.3 EXAMPLE 3

Formulation:

A mixture having the following composition ("Before extraction" column) was prepared:

TABLE 3.1

|  | Before extraction | | After extraction | |
|---|---|---|---|---|
| Composition | % weight | % volume | % weight | % volume |
| BP2 | 3.1 | 5.1 | 4.6 | 8.7 |
| SP1 | 21.0 | 26.5 | 0 | 0 |
| SP2 | 11.3 | 14.3 | 0 | 0 |
| F1 | 64.6 | 54.1 | 95.4 | 91.3 |

Preparation Method:

Stage a: Preparation of the Composition and Formation of a Film of Composite Material The procedure as in stage a of example 2 was used.

Stage b: Shaping

The mixture obtained was subsequently calendered in the form of a sheet with a thickness of 0.5 cm.

Stage c: Removal of the Sacrificial Phase

The procedure as in stage c of example 2 was used. An expansion in volume of the material is observed during this stage. A porous material is obtained which consists of binder-forming polymer BP2 and of filler F1 in the proportions of table 3.1 ("After extraction" column).

Stage d: Compression

The mixture is compressed under a press at 80° C. and 50 bar down to a film thickness of 0.5 cm, in order to regain the original thickness. This is because, during the decomposition, a slight swelling of the mixture is observed The material after compression exhibits a density of 1.05 g/cm$^3$ instead of 1.82 g/cm$^3$ in theory. It is deduced, from the measurement of the density, that the material obtained exhibits a porosity of 42% by volume, with respect to the total volume of the material.

Properties:

On conclusion of stage d, the thermal conductivity of the material was measured in the radial direction and in the axial direction. The thermal conductivities obtained are reported in table 3.2.

TABLE 3.2

| Direction | Thermal conductivity (W/m · K) |
|---|---|
| Radial | 22.4 |
| Axial | 1.55 |

It is found that the material obtained has several properties simultaneously: a high thermal conductivity, an orientation of the fillers and also a low density.

II.4 EXAMPLE 4

Formulation:

A mixture having the following composition ("Before extraction" column) as prepared:

TABLE 4.1

|             | Before extraction | | After extraction | |
| --- | --- | --- | --- | --- |
| Composition | % weight | % volume | % weight | % volume |
| BP2 | 4.2 | 9.0 | 5.0 | 15.0 |
| SP1 | 7.7 | 20.0 | 0 | 0 |
| SP2 | 7.6 | 20.0 | 0 | 0 |
| F2 | 80.5 | 51.0 | 95.0 | 85.0 |

Preparation Method:

Stage a: Preparation of the Composition and Formation of a Film of Composite Material The procedure as in stage a of example 2 was used.

Stage b: Shaping

The mixture obtained was subsequently calendered in the form of a sheet with a thickness of 1 cm.

Stage c: Removal of the Sacrificial Phase

The procedure as in stage c of example 2 was used. No expansion in volume of the material during this stage can be noticed. A porous material is obtained which consists of binder-forming polymer BP2 and of filler F2 in the proportions of table 3.1 ("After extraction" column).

Stage d: Compression

The mixture is compressed under a press at 80° C. down to a film thickness of 1 cm in order to provide the original thickness, even if no swelling of the mixture is observed.

The invention claimed is:

1. A process for the preparation of a porous composite material comprising at least:
    (A) a binder-forming polymeric phase based on at least one polymer selected from the group consisting of thermoplastics, elastomers, and thermoplastic elastomers, wherein the elastomers and/or the thermoplastic elastomers represent at least 95% by weight of the polymers of the binder-forming polymeric phase, and
    (B) one or more fillers consisting essentially of thermally conductive fillers exhibiting a thermal conductivity of greater than or equal to 5 W/mK and electrically conductive fillers exhibiting a resistivity of less than or equal to 0.1 ohm.cm,
    the fillers (B) representing at least 75% by weight, with respect to the sum of the weights of the polymeric phase (A) and of the fillers (B), this process comprising the following stages:
    a) hot mixing, by the molten route, the polymeric phase (A), the fillers (B) and a sacrificial polymeric phase (C), so as to obtain a mixture,
    b) shaping the mixture,
    c) removing the sacrificial polymeric phase,
    and the sacrificial polymeric phase (C) represents at least 15% by weight of the total weight of the mixture of stage a),
    the porous composite material comprising, by weight, with respect to the total weight of the material, from 0% to 5% of one or more decomposition residues from the sacrificial phase.

2. The process as claimed in claim 1, wherein the fillers (B) represent at least 80%, by weight, with respect to the sum of the weights of the polymeric phase (A) and of the fillers (B).

3. The process as claimed in claim 1, wherein the sacrificial polymeric phase (C) represents from 20% to 80% by weight of the total weight of the mixture of stage a).

4. The process as claimed in claim 1, wherein stage a) is carried out in an internal mixer or in an extruder.

5. The process as claimed in claim 1, wherein stage c) is carried out by decomposition by the thermal route of the sacrificial polymeric phase.

6. The process as claimed in claim 1, wherein the binder-forming polymeric phase is based on at least one polymer selected from the group consisting of polyacrylonitrile, halogenated polymers, acrylic polymers, acrylates, methacrylates, polyethers, polyamides, hydrogenated acrylonitrile/butadiene, copolymers of ethylene and of an alkyl acrylate, polyisoprene or rubbers.

7. The process as claimed in claim 1, wherein the fillers are selected from the group consisting of aluminum nitride, boron nitride, magnesium silicon nitride, silicon carbide, diamond, and their mixtures.

8. The process as claimed in claim 1, wherein the fillers are selected from the group consisting of graphite, graphene, carbon nanotubes (CNTs), carbon black, metal fillers, and their mixtures.

9. The process as claimed in claim 1, wherein stage b) comprises a fashioning in the film form.

10. The process as claimed in claim 1, wherein it additionally comprises, on conclusion of stage c), a compression stage d).

11. The process as claimed in claim 1, wherein it results in a material that exhibits the following composition, by weight, with respect to the total weight of the material:
    from 3% to 25% of a binder-forming polymeric phase selected from the group consisting of thermoplastic polymers, elastomers, and thermoplastic elastomers, wherein the elastomers and the thermoplastic elastomers represent at least 95% by weight of the polymers of the binder-forming polymeric phase,
    from 75% to 97% of at least one filler selected from the group consisting of thermally conductive fillers exhibiting a thermal conductivity of greater than or equal to 5 W/mK and electrically conductive fillers exhibiting a resistivity of less than or equal to 0.1 ohm.cm,
    from 0% to 5% of one or more additives or decomposition residues from the sacrificial phase.

12. A porous composite material capable of being obtained by the process as claimed in claim 1, wherein it exhibits the following composition, by weight, with respect to the total weight of the material:
    from 3% to 25% of at least one polymer selected from the group consisting of thermoplastic polymers, elastomers, and thermoplastic elastomers,
    from 75% to 97% of at least one filler selected from the group consisting of thermally conductive fillers exhibiting a thermal conductivity of greater than or equal to 5 W/mK and electrically conductive fillers exhibiting a resistivity of less than or equal to 0.1 ohm.cm,
    from 0% to 5% of one or more additives or decomposition residues from the sacrificial phase.

13. The process as claimed in claim 1, wherein the binder-forming polymeric phase (A) comprises at least 50% by weight of at least one polymer selected from the group consisting of polyacrylonitrile, hydrogenated acrylonitrile/butadiene, and their mixtures.

14. The process as claimed in claim 1, wherein the binder-forming polymeric phase (A) consists essentially of at least one polymer selected from the group consisting of polyacrylonitrile, hydrogenated acrylonitrile/butadiene, and their mixtures.

15. A process for the manufacture of a thermally conductive and/or electrically conductive porous carbon-based material, this process comprising the implementation of the process as claimed in claim 1 and additionally comprising, on conclusion of this process, at least one stage d') of pyrolysis or of graphitization.

16. The process as claimed in claim 5, wherein the sacrificial polymeric phase is based on at least one polymer selected from the group consisting of polyalkene carbonates.

17. The process as claimed in claim 16, wherein the sacrificial polymeric phase is based on at least one polymer selected from the group consisting of polyethylene carbonates and polypropylene carbonates.

18. The process as claimed in claim 10, wherein it results in a material comprising a polymeric matrix, based on polymer selected from the group consisting of thermoplastic polymers, elastomers, and thermoplastic elastomers, comprising at least 95% by weight of elastomers and/or thermoplastic elastomers, and thermally conductive fillers and exhibiting a thermal conductivity in at least one direction of greater than or equal to 15 W/m.K.

19. A material capable of being obtained by the process as claimed in claim 10, comprising a polymeric matrix, based on polymer selected from the group consisting of thermoplastic polymers, elastomers, and thermoplastic elastomers, and thermally conductive fillers and exhibiting a thermal conductivity in at least one direction of greater than or equal to 15 W/m.K.

20. The process as claimed in claim 11, wherein it results in a porous composite material selected from the group consisting of a self-supported material and a coating with a thickness of greater than or equal to 250 µm.

21. The porous composite material as claimed in claim 12, wherein it is selected from the group consisting of a self-supported material and a coating with a thickness of greater than or equal to 250 µm.

* * * * *